US012793918B2

(12) United States Patent
Nakahashi et al.

(10) Patent No.: US 12,793,918 B2
(45) Date of Patent: Nov. 10, 2026

(54) ELECTRIC CIRCUIT BREAKER DEVICE

(71) Applicant: DAICEL CORPORATION, Osaka (JP)

(72) Inventors: Katsuhiro Nakahashi, Tokyo (JP); Yuya Kaiga, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 265 days.

(21) Appl. No.: 18/701,042

(22) PCT Filed: Oct. 13, 2022

(86) PCT No.: PCT/JP2022/038221
§ 371 (c)(1),
(2) Date: Apr. 12, 2024

(87) PCT Pub. No.: WO2023/063393
PCT Pub. Date: Apr. 20, 2023

(65) Prior Publication Data

US 2024/0347295 A1 Oct. 17, 2024

(30) Foreign Application Priority Data

Oct. 14, 2021 (JP) ................................ 2021-169081

(51) Int. Cl.
*H01H 39/00* (2006.01)

(52) U.S. Cl.
CPC ................................ *H01H 39/006* (2013.01)

(58) Field of Classification Search
CPC ................ H01H 39/006; H01H 39/00; H01H 2039/008; H01H 9/30; H01H 85/0241;
(Continued)

(56) References Cited

U.S. PATENT DOCUMENTS

| | | | | |
|---|---|---|---|---|
| 10,431,406 | B2 | 10/2019 | Gaudinat et al. | |
| 2021/0407752 | A1 | 12/2021 | Gaudinat et al. | |
| 2022/0285114 | A1 * | 9/2022 | Nakamura ............ | H01H 39/00 |

FOREIGN PATENT DOCUMENTS

| | | | |
|---|---|---|---|
| EP | 1 422 735 | A2 | 5/2004 |
| EP | 2 660 838 | A1 | 11/2013 |

(Continued)

OTHER PUBLICATIONS

English translation of the International Search Report for International Application No. PCT/JP2022/038221, dated Dec. 13, 2022.

(Continued)

*Primary Examiner* — Ahmed M Saeed
(74) *Attorney, Agent, or Firm* — Birch, Stewart, Kolasch & Birch, LLP

(57) ABSTRACT

An electric circuit breaker device includes: a housing serving as an outer shell member and enclosing an accommodating space extending in one direction; an igniter provided in the housing; a projectile disposed in the housing and configured to be projected from one end side of the accommodating space by energy received from the igniter, the projectile being configured to move along an extending direction of the accommodating space; and a conductor piece held by the housing and forming a portion of an electric circuit, the conductor piece including a cutoff portion between a first connection end portion and a second connection end portion, the cutoff portion being cut off by movement of the projectile and being disposed across the accommodating space, in which a region defined by an inner wall of the housing holding the conductor piece in the accommodating space serves as a holding region, the housing includes a housing body enclosing the holding region, and the body includes an inner forming portion disposed facing the holding region and an outer forming portion formed separately from the inner forming portion, the outer (Continued)

forming portion being disposed on an outer circumferential side of the inner forming portion.

6 Claims, 7 Drawing Sheets

(58) Field of Classification Search
CPC ...... H01H 9/302; H01H 50/546; H01H 89/00; H01H 39/004; H01H 33/04; H01H 9/04
See application file for complete search history.

(56) References Cited

FOREIGN PATENT DOCUMENTS

| | | | |
|---|---|---|---|
| JP | 2013-239411 | A | 11/2013 |
| JP | 2021-61147 | A | 4/2021 |
| WO | WO2006/040714 | A1 | 4/2006 |
| WO | WO 2012/072281 | A1 | 6/2012 |
| WO | WO 2018/019945 | A1 | 2/2018 |
| WO | WO 2020/099546 | A1 | 5/2020 |
| WO | WO2020/204154 | A1 | 10/2020 |

OTHER PUBLICATIONS

English translation of the Written Opinion of the International Searching Authority for International Application No. PCT/JP2022/038221, dated Dec. 13, 2022.
Extended European Search Report for European Application No. 22881088.3, dated Sep. 12, 2025.

* cited by examiner

ELECTRIC CIRCUIT BREAKER DEVICE

TECHNICAL FIELD

The present invention relates to an electric circuit breaker device.

BACKGROUND ART

An electric circuit may be provided with a breaker device that is actuated when an abnormality occurs in a device constituting the electric circuit or when an abnormality occurs in a system in which the electric circuit is mounted, thereby urgently interrupting the continuity of the electric circuit. As one aspect thereof, there has been proposed an electric circuit breaker device that forcibly and physically cuts a conductor piece forming a portion of an electric circuit by moving a projectile at high speed by energy applied from an igniter or the like (see, for example, Patent Document 1). Further, in recent years, electric circuit breaker devices applied to electric vehicles equipped with a high-voltage power source are becoming increasingly important.

CITATION LIST

Patent Literature

Patent Document 1: WO 2012/072261 A
Patent Document 2: WO2018/019945A1
Patent Document 3: European Patent No. 1422735

SUMMARY OF INVENTION

Technical Problem

The electric circuit breaker device may have a resin housing and a metal holder combined together for weight reduction and size reduction. In this case, in the electric circuit breaker device, the projectile projected during actuation cuts a conductor piece and then is stopped when striking against a portion of the resin housing, but the resin housing is broken during actuation, so that there is a possibility that gas evaporated by arc discharge during cutting leaks. Therefore, it is desirable to suppress generation of gas leakage.

The technology of the present disclosure has been made in view of the above circumstances, and an object thereof is to provide an electric circuit breaker device in which generation of gas leakage after cutting is suppressed.

Solution to Problem

In order to solve the above problem, an electric circuit breaker device of the present disclosure includes:

a housing serving as an outer shell member and enclosing an accommodating space extending in one direction;

an igniter provided in the housing;

a projectile disposed in the housing and configured to be projected from one end side of the accommodating space by energy received from the igniter, the projectile being configured to move along an extending direction of the accommodating space; and a conductor piece held by the housing and forming a portion of an electric circuit, the conductor piece including a cutoff portion between a first connection end portion and a second connection end portion, the cutoff portion being cut off by movement of the projectile and being disposed across the accommodating space, in which a region defined by an inner wall of the housing holding the conductor piece in the accommodating space serves as a holding region, the housing includes a housing body enclosing the holding region, and the housing body includes an inner forming portion disposed facing the holding region and an outer forming portion formed separately from the inner forming portion, the outer forming portion being disposed on an outer circumferential side of the inner forming portion.

Advantageous Effects of Invention

According to the present disclosure, an electric circuit breaker device that suppresses generation of gas leakage after actuation can be provided.

DESCRIPTION OF EMBODIMENTS

First Embodiment

An electric circuit breaker device according to an embodiment of the present disclosure will be described below with reference to the drawings. Note that each of the configurations, combinations thereof, and the like in the embodiment are an example, and various additions, omissions, substitutions, and other changes may be made as appropriate without departing from the spirit of the present disclosure. The present disclosure is not limited by the embodiment and is limited only by the claims.

Configuration

Figure 1:
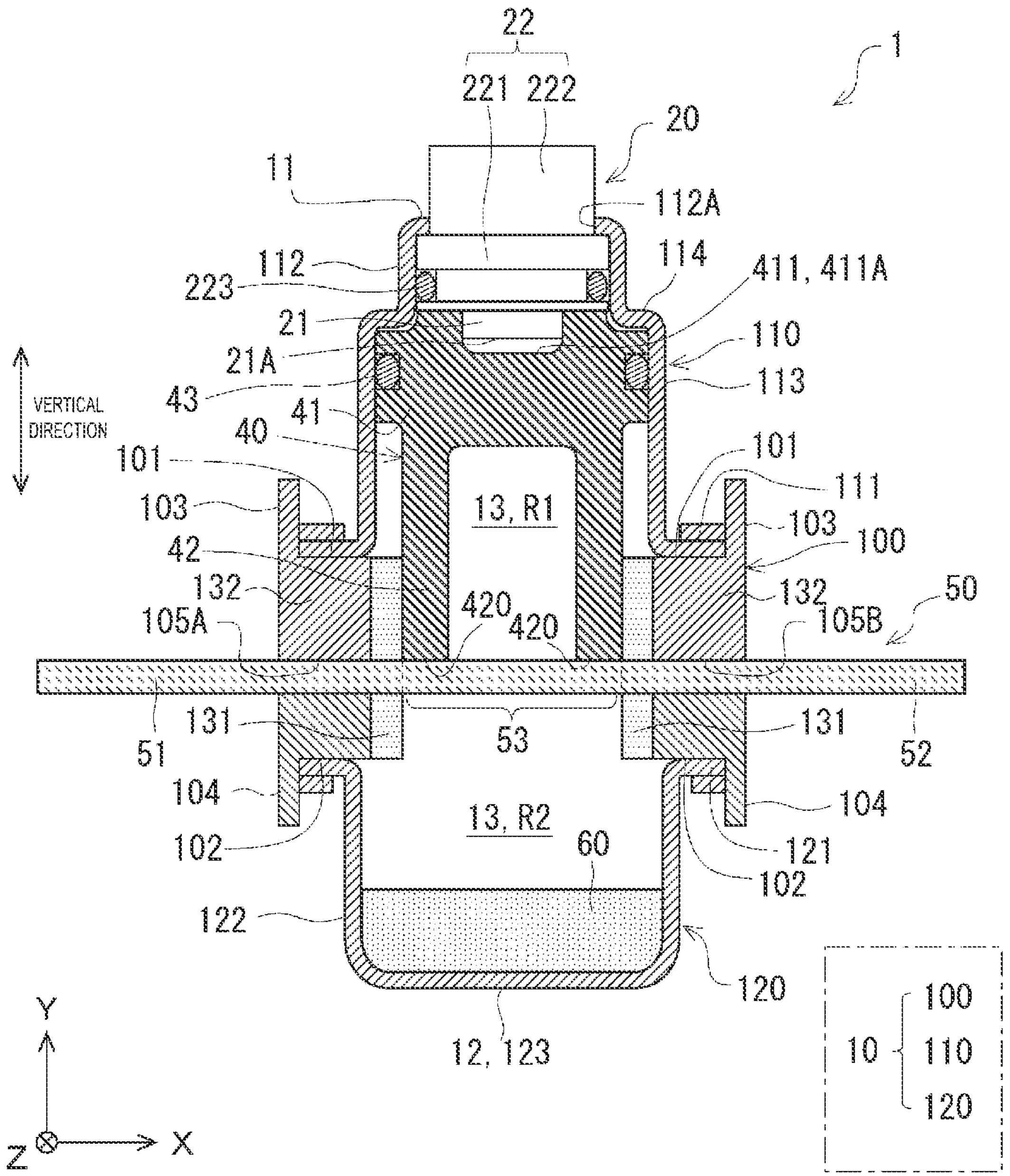
FIG. 1 is a view illustrating an internal structure of an electric circuit breaker device 1 according to an embodiment.

FIG. 1 is a view illustrating an internal structure of an electric circuit breaker device (hereinafter simply referred to as the "breaker device") 1 according to an embodiment. The breaker device 1 is a device that interrupts an electric circuit included in a vehicle, an electric home appliance, a photovoltaic system, or the like when an abnormality occurs in the electric circuit or in a system including a battery (lithium ion battery, for example) of the electric circuit, thereby preventing great damage. In the present specification, a cross section in the height direction in FIG. 1 (direction in which an accommodating space 13 described later extends) is referred to as a vertical cross section of the breaker device 1, and a cross section in a direction orthogonal to the height direction is referred to as a transverse cross section of the breaker device 1. FIG. 1 illustrates a state prior to actuation of the breaker device 1.

The breaker device 1 includes a housing 10, an igniter 20, a projectile 40, a conductor piece 50, and a coolant material 60. The housing 10 serves as an outer shell member and encloses an accommodating space 13 extending in a direction from a first end portion 11 on an upper end side toward a second end portion 12 on a lower end side. This accommodating space 13 is a space formed linearly, making the projectile 40 movable, and extends along a vertical direction of the breaker device 1. As illustrated in FIG. 1, the projectile 40 is accommodated on the upper end side in the vertical direction (extending direction) of the accommodating space 13 formed inside the housing 10. In the present specification, the vertical direction is also referred to as a Y-axis direction, the left-right direction is also referred to as an X-axis direction, and the depth direction is also referred to as a Z-axis direction. However, in the present specification, the vertical direction and the XYZ directions of the breaker device 1 merely indicate a relative positional relationship of elements in the breaker device 1 for convenience of description of the embodiment. For example, the orientation at the time of installing the breaker device 1 is not limited to the direction illustrated in the drawing.

Housing

The housing 10 includes a housing body 100, a top holder 110, and a bottom container 120. The housing body 100 is bonded to the top holder 110 and the bottom container 120, thereby forming the housing 10 that is integral.

The housing body 100 has, for example, a substantially prismatic outer shape. However, the shape of the housing body 100 is not particularly limited. In addition, the housing body 100 includes a cavity portion 145 formed therethrough along the vertical direction. This cavity portion 145 forms a portion of the accommodating space 13. The housing body 100 includes an inner forming portion 131 in contact with the cavity portion 145 and an outer forming portion 132 in contact with the outer circumferential side of the inner forming portion 131 and not in contact with the cavity portion 145. The outer forming portion 132 is disposed on the outer circumferential side of the inner forming portion 131. The inner forming portion 131 and the outer forming portion 132 are integrated. In addition, the housing body 100 has an upper surface 101 on which a flange portion 111 of the top holder 110 is fixed and a lower surface 102 on which a flange portion 121 of the bottom container 120 is fixed. The upper surface 101 extends across the inner forming portion 131 and the outer forming portion 132. The lower surface 102 extends across the inner forming portion 131 and the outer forming portion 132. In the present embodiment, an upper tubular wall 103 having a tubular shape is provided erected upward from the upper surface 101 on the outer circumferential side of the upper surface 101 in the housing body 100. In the present embodiment, the upper tubular wall 103 has a rectangular tubular shape, for example, but may have any other shape. On the outer circumferential side of the lower surface 102 in the housing body 100, a lower tubular wall 104 having a tubular shape is provided suspended downward from the lower surface 102. In the present embodiment, the lower tubular wall 104 has a rectangular tubular shape, for example, but may have any other shape. The upper tubular wall 103 and the lower tubular wall 104 exist in the outer forming portion 132.

The inner forming portion 131 and the outer forming portion 132 of the housing body 100 configured as described above can be formed of an insulating member such as a synthetic resin, for example. The material of the inner forming portion 131 and the material of the outer forming portion 132 may be different materials or the same material. The inner forming portion 131 and the outer forming portion 132 are separately formed (twice formation) regardless of whether they are made of different materials or the same material. By being separately formed, even if a crack is generated in the inner forming portion 131 due to impact or the like, generation of the crack is suppressed in the outer forming portion 132. That is, the crack generated in the inner forming portion 131 can be kept in the inner forming portion 131. In the twice formation, for example, after the inner forming portion 131 is formed with the material of the inner forming portion 131 using a first mold, the inner forming portion 131 is set in a second mold, and the outer forming portion 132 is formed with the material of the outer forming portion 132. Alternatively, the twice formation may be performed, using one mold, in such a manner that after the outer forming portion 132 is formed with a first material, and then the inner forming portion 131 is formed with a second material. The twice formation may be performed by another method. The first material and the second material may be the same or different. For example, the housing body 100 may be formed from nylon, which is a type of polyamide synthetic resin. The inner forming portion 131 may be formed from polycarbonate or the like, for example. The outer forming portion 132 may be formed from, for example, polycarbonate, polyamide, ABS resin, or the like. The outer forming portion 132 is preferably higher in heat resistance temperature than the inner forming portion 131. The inner forming portion 131 is preferably higher in impact resistance than the outer forming portion 132. The impact resistance is durability against an impact received from the outside. The impact resistance is evaluated by an impact value based on a predetermined impact test, for example. The inner forming portion 131 may be formed separately by being divided into an upper forming portion disposed above (the top holder 110 side and the igniter 20 side) and a lower forming portion disposed below (the bottom container 120 side and a movement destination side of the projectile 40). Since the upper forming portion and the lower forming portion are separately formed, propagation of a crack generated in the upper part (the upper forming portion) of the inner forming portion 131 and generation of a crack in the lower part (the lower forming portion) of the inner forming portion 131 are suppressed. Alternatively, the outer forming portion 132 may be separately formed by being divided into the upper forming portion disposed above and the lower forming portion disposed below. That is, the housing body 100 may be formed three or more times. Since the housing body 100 is formed a plurality of times, generation of a void can be suppressed. A part (resin interface) between the inner forming portion 131 and the outer forming portion 132 may be welded. A part (resin interface) between the inner forming portion 131 and the outer forming portion 132 may be sealed with a sheet-like gasket.

Figure 2:
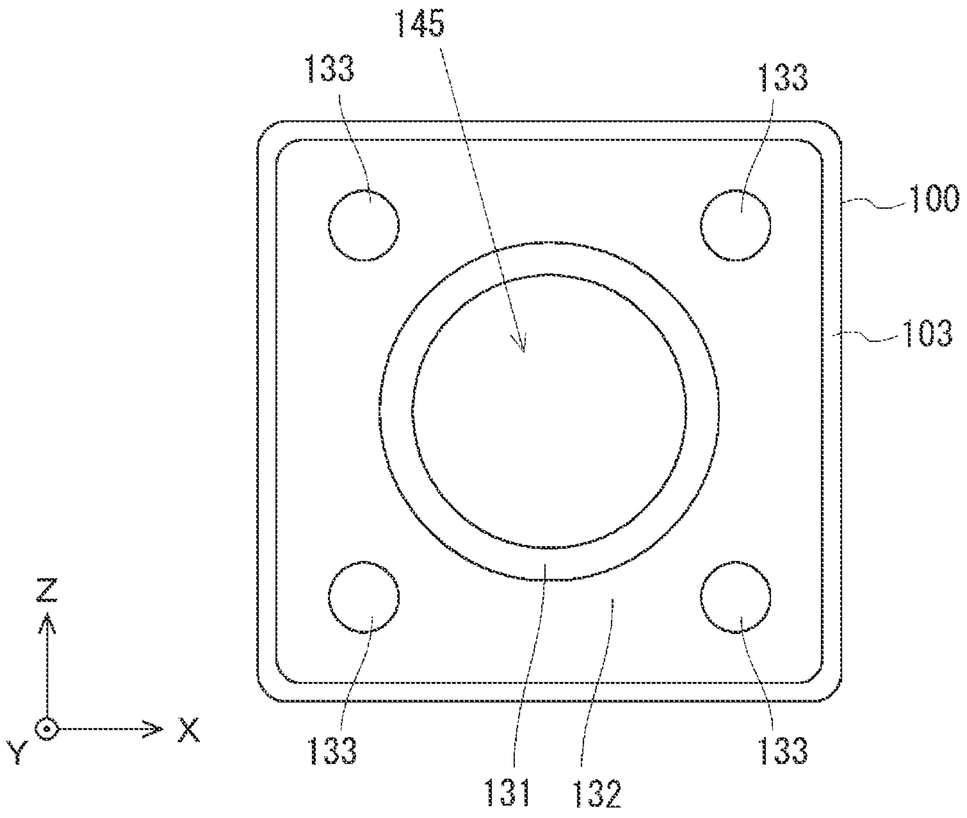
FIG. 2 is an example of a top view of a housing body 100.

FIG. 2 is an example of a top view of the housing body 100. The housing body 100 has a substantially quadrangular outer shape in plan view; and the center thereof is provided with the cavity portion 145. This cavity portion 145 forms a portion of the accommodating space 13 when the housing body 100 is combined with another member constituting the housing 10. The inner forming portion 131 is provided around the cavity portion 145, and the outer forming portion 132 is provided around the inner forming portion 131. The left and right of the cavity portion 145 are provided with conductor piece holding holes 105A and 105B, which are holes extending through the inner forming portion 131 and the outer forming portion 132 and through which the conductor piece 50 passes. By making the conductor piece 50 pass through the conductor piece holding holes 105A and 105B, the conductor piece 50 is disposed across the cavity portion 145 (the accommodating space 13). The housing body 100 is provided at four corners with bolt passing holes 133 extending in the vertical direction. On an outer edge part of the upper surface in the housing body 100, the upper tubular wall 103 having a rectangular tubular shape is provided erected upward from the upper surface.

Top Holder

Next, the top holder 110 will be described. The top holder 110 is, for example, a cylindrical member having a stepped cylindrical tubular shape with a hollow inside. The top holder 110 includes a small diameter cylinder portion 112 positioned on the upper side (first end portion 11 side), a large diameter cylinder portion 113 positioned on the lower side, a connection portion 114 connecting these, and the flange portion 111 extending outward from a lower end of the large diameter cylinder portion 113. For example, the small diameter cylinder portion 112 and the large diameter cylinder portion 113 are coaxially disposed, and the large diameter cylinder portion 113 has a diameter slightly larger than that of the small diameter cylinder portion 112.

The contour of the flange portion 111 in the top holder 110 has a substantially quadrangular shape that fits inside the upper tubular wall 103 in the housing body 100. The flange portion 111 is provided, extending in a vertical direction, with a bolt passing hole (not illustrated) through which a fastening bolt passes.

The cavity portion formed inside the small diameter cylinder portion 112 in the top holder 110 functions as an accommodating space for accommodating a portion of the igniter 20 as illustrated in FIG. 1. Further, the cavity portion formed inside the large diameter cylinder portion 113 in the top holder 110 communicates with the cavity portion of the housing body 100 positioned below; and forms a portion of the accommodating space 13. The top holder 110 configured as described above can be formed from an appropriate metal member, such as stainless steel or aluminum, having excellent strength and durability, for example. However, a material for forming the top holder 110 is not particularly limited. In addition, for the shape of the top holder 110 as well, the above aspect is an example, and other shapes may be adopted.

Bottom Container

Next, the bottom container 120 will be described. The bottom container 120 has a substantially tubular bottomed shape with a hollow inside, and includes a side wall portion 122, a bottom wall portion 123 connected to a lower end of the side wall portion 122, and a flange portion 121 connected to an upper end of the side wall portion 122. The side wall portion 122 has, for example, a cylindrical tubular shape. The flange portion 121 extends outward from the upper end of the side wall portion 122. The contour of the flange portion 121 in the bottom container 120 has a substantially quadrangular shape that fits inside the lower tubular wall 104 in the housing body 100. The flange portion 121 is provided, extending in a vertical direction, with a bolt passing hole (not illustrated) through which a fastening bolt passes.

Note that the above aspect regarding the shape of the bottom container 120 is an example, and other shapes may be adopted. Further, the cavity portion formed inside the bottom container 120 communicates with the housing body 100 positioned above, and forms a portion of the accommodating space 13. The bottom container 120 configured as described above can be formed from an appropriate metal member, such as stainless steel or aluminum, having excellent strength and durability, for example. However, a material for forming the bottom container 120 is not particularly limited. Further, the bottom container 120 may have a multilayer structure. For example, in the bottom container 120, an exterior portion facing the outside may be formed from an appropriate metal member, such as stainless steel or aluminum, having excellent strength and durability, and an interior portion facing the accommodating space 13 side may be formed from an insulating member such as a synthetic resin. Of course, the entire bottom container 120 may be formed from an insulating member.

As described above, the housing 10 in the present embodiment is configured by integrally assembling, in the vertical direction, the housing body 100, the top holder 110, and the bottom container 120, which are integrally assembled. In the process of this assembly, the conductor piece 50 is disposed through the inside of the housing body 100. For example, the conductor piece 50 is passed through the conductor piece holding holes 105A and 105B of the housing body 100, and the conductor piece is disposed across the cavity portion 145. In this state, the flange portion 111 of the top holder 110 is inserted through inside the upper tubular wall 103 in the housing body 100 to dispose the top holder 110 on the housing body 100, and the flange portion 121 of the bottom container 120 is inserted through inside the lower tubular wall 104 in the housing body 100 to dispose the bottom container 120 under the housing body 100. Then, bolts are passed through the bolt passing holes of the top holder 110, the housing body 100, and the bottom container 120 to fasten the respective portions. This fastening is not limited to the bolt, and may be performed by any other fastening mechanism such as a rivet.

In addition, each portion may be coupled in a state where a sealant is applied between the top holder 110 and the housing body 100, between the housing body 100 and the conductor piece 50, and between the housing body 100 and the bottom container 120. Thereby, airtightness of this tubular accommodating space 13 formed in the housing 10 can be increased. The airtightness of the accommodating space 13 may be increased by interposing a packing or a gasket between the respective portions in place of the sealant or in combination with a sealant. This accommodating space 13 accommodates the igniter 20, the projectile 40, a cutoff portion 53 of the conductor piece 50, the coolant material 60, and the like described in detail below.

Igniter

Next, the igniter 20 will be described. The igniter 20 is an electric igniter that includes an ignition portion 21 with an ignition charge, and an igniter body 22 including a pair of conduction pins (not illustrated) connected to the ignition portion 21. The igniter body 22 is surrounded by an insulating resin, for example. Further, tip end sides of the pair of conduction pins in the igniter body 22 are exposed to the outside, and are connected to a power source when the breaker device 1 is used.

The igniter body 22 includes a body portion 221 having a substantially circular columnar shape and accommodated inside the small diameter cylinder portion 112 in the top holder 110, and a connector portion 222 positioned on the body portion 221. The igniter body 22 is fixed to the small diameter cylinder portion 112 by press-fitting, for example, the body portion 221 to an inner circumferential surface of the small diameter cylinder portion 112. Further, a constricted portion having an outer circumferential surface recessed as compared with other locations is annularly formed along a circumferential direction of the body portion 221 at an axially intermediate portion of the body portion 221. An O-ring 223 is fitted into this constricted portion. The O-ring 223 is formed from, for example, rubber (silicone rubber, for example) or a synthetic resin, and functions to increase airtightness between the inner circumferential surface in the small diameter cylinder portion 112 and the body portion 221.

The connector portion 222 in the igniter 20 is disposed protruding to the outside through an opening 112A formed at an upper end of the small diameter cylinder portion 112. The connector portion 222 has, for example, a cylindrical tubular shape covering sides of the conduction pins, allowing connection with a connector of a power source.

As illustrated in FIG. 1, the ignition portion 21 of the igniter 20 is disposed facing the accommodating space 13 (more specifically, the cavity portion formed inside the large diameter cylinder portion 113) of the housing 10. The ignition portion 21 is configured as a form accommodating an ignition charge in an igniter cup, for example. For example, the ignition charge is accommodated in the igniter cup in the ignition portion 21 in a state of being in contact with a bridge wire (resistor) suspended coupling the base ends of the pair of conduction pins to each other. As the ignition charge, for example, zirconium-potassium perchlorate (ZPP), zirconium-tungsten-potassium perchlorate (ZWPP), titanium hydride-potassium perchlorate (THPP), lead trocinate, or the like may be adopted.

In actuation of the igniter 20, when an actuating current for igniting the ignition charge is supplied from the power source to the conduction pins, the bridge wire in the ignition portion 21 generates heat, and as a result, the ignition charge in the igniter cup is ignited and burns, generating a combustion gas. Then, the pressure in the igniter cup increases along with the combustion of the ignition charge in the igniter cup of the ignition portion 21, a rupture surface 21A of the igniter cup ruptures, and the combustion gas is discharged from the igniter cup into the accommodating space 13. More specifically, the combustion gas from the igniter cup is discharged into a recess 411 in a piston portion 41 described later of the projectile 40 disposed in the accommodating space 13. Thereby, the projectile 40 is projected downward from the initial position in FIG. 1 along the accommodating space 13.

Conductor Piece

Figure 3:
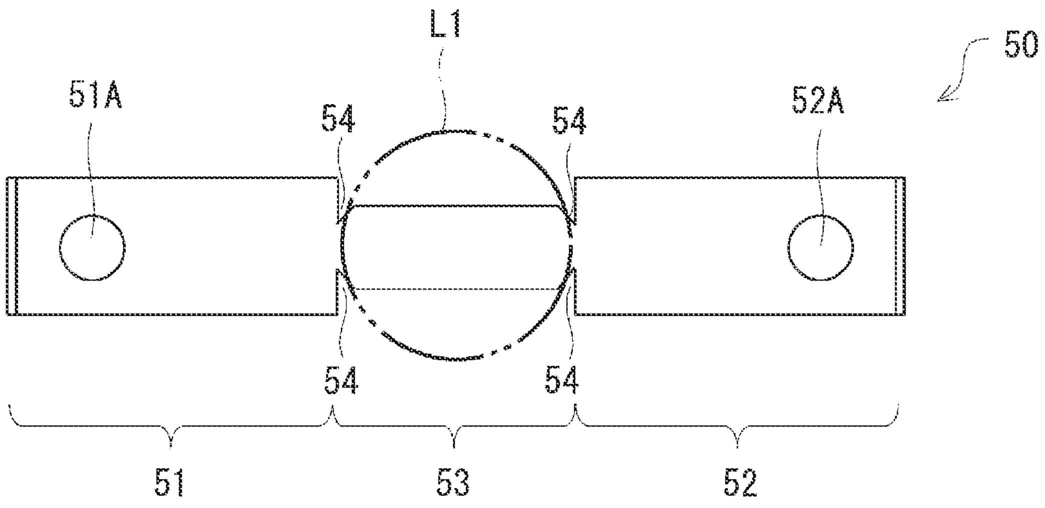
FIG. 3 is a top view of a conductor piece 50.

Next, the conductor piece 50 will be described. FIG. 3 is a top view of the conductor piece 50. The conductor piece 50 is a metal body having conductivity that constitutes a portion of the components of the breaker device 1 and, when the breaker device 1 is attached to a predetermined electric circuit, forms a portion of the electric circuit, and may be referred to as a bus bar. The conductor piece 50 is held by the housing body 100 and disposed across the cavity portion 145 in the housing body. In the present embodiment, a region (cavity portion 145) defined by an inner wall of the housing body 100 holding the conductor piece 50 in this way serves as a holding region.

The conductor piece 50 can be formed from a metal such as copper (Cu), for example. However, the conductor piece 50 may be formed from a metal other than copper, or may be formed from an alloy of copper and another metal. Note that examples of metals other than copper included in the conductor piece 50 include manganese (Mn), nickel (Ni), and platinum (Pt).

In one aspect illustrated in FIG. 3, the conductor piece 50 is formed as an elongated flat plate piece as a whole, and includes a first connection end portion 51 and a second connection end portion 52 on both end sides, and the cutoff portion 53 positioned in an intermediate part of them. The first connection end portion 51 and the second connection end portion 52 of the conductor piece 50 are provided with connection holes 51A and 52A, respectively. These connection holes 51A, 52A are used to connect with other conductors (lead wires, for example) in the electric circuit. Note that in FIG. 1, the connection holes 51A and 52A in the conductor piece 50 are not illustrated. The cutoff portion 53 of the conductor piece 50 is a site that is forcibly and physically cut by the rod portion 42 of the projectile 40 and cut off from the first connection end portion 51 and the second connection end portion 52 when an abnormality such as an excessive current occurs in the electric circuit to which the breaker device 1 is applied. Notches (slits) 54 are formed at both ends of the cutoff portion 53 of the conductor piece 50, making it easy to cut and cut off the cutoff portion 53.

The conductor piece 50 is cut at a position overlapping an inner surface (inner wall surface) of the inner wall defining the cavity portion 145 of the housing body 100, that is, a position overlapping an outer circumferential surface of the rod portion 42, and the cutoff portion 53 is cut off.

Here, various forms of the conductor piece 50 can be adopted, and a shape thereof is not particularly limited. In the example illustrated in FIG. 2, the surfaces of the first connection end portion 51, the second connection end portion 52, and the cutoff portion 53 form the same plane, but no such limitation is intended. For example, in the conductor piece 50, the cutoff portion 53 may be connected to the first connection end portion 51 and the second connection end portion 52 in an orthogonal or inclined orientation. Further, the planar shape of the cutoff portion 53 of the conductor piece 50 is not particularly limited, either. Of course, the shapes of the first connection end portion 51 and the second connection end portion 52 in the conductor piece 50 are also not particularly limited. Further, the notches 54 in the conductor piece 50 can be omitted as appropriate.

Coolant Material

Next, the coolant material 60 disposed in the accommodating space 13 in the housing 10 will be described. Here, as illustrated in FIG. 1, before actuation of the breaker device 1 (the igniter 20), the cutoff portion 53 of the conductor piece 50 in a state of being held in the pair of conductor piece holding holes 105A and 105B in the housing body 100 is laterally bridged across the accommodating space 13 of the housing 10. Hereinafter, within the accommodating space 13 of the housing 10 separated by the cutoff portion 53 of the conductor piece 50, a region (space) in which the projectile 40 is disposed is referred to as a "projectile initial arrangement region R1", and a region (space) positioned on the opposite side of the projectile 40 is referred to as an "arc-extinguishing region R2". Note that as described above, since the gap is formed on the side of the cutoff portion 53 disposed across the accommodating space 13, the projectile initial arrangement region R1 and the arc-extinguishing region R2 are not completely isolated from each other by the cutoff portion 53, but communicate with each other. Of course, depending on the shape and size of the cutoff portion 53, the projectile initial arrangement region R1 and the arc-extinguishing region R2 may be completely isolated from each other by the cutoff portion 53.

The arc-extinguishing region R2 of the accommodating space 13 is a region (space) for receiving the cutoff portion 53 cut off by the rod portion 42 of the projectile 40 projected during actuation of the breaker device 1 (igniter 20). In this arc-extinguishing region R2, the coolant material 60 as an arc-extinguishing material is disposed. The coolant material 60 is a coolant material for removing thermal energy of the arc generated and the cutoff portion 53 when the projectile 40 cuts off the cutoff portion 53 of the conductor piece 50, and cooling the arc and the cutoff portion 53, thereby suppressing arc generation during cutting off of a current or thereby extinguishing (eliminating) the generated arc.

The arc-extinguishing region R2 in the breaker device 1 is a space for receiving the cutoff portion 53 cut off from the first connection end portion 51 and the second connection end portion 52 of the conductor piece 50 by the projectile 40, and at the same time, has a meaning as a space for effectively extinguishing an arc generated when the projectile 40 cuts off the cutoff portion 53. Then, in order to effectively extinguish the arc generated when the cutoff portion 53 is cut off from the conductor piece 50, the coolant material 60 is disposed as an arc-extinguishing material in the arc-extinguishing region R2.

As one aspect of the embodiment, the coolant material 60 is solid. As one aspect of the embodiment, the coolant material 60 is formed from a shape retaining body. The shape retaining body herein is, for example, a material that can keep a constant shape when no external force is applied and can hold the integrity (does not come apart), even if deformation can occur, when an external force is applied. For example, examples of the shape retaining body include a fibrous body formed into a desired shape. In the present embodiment, the coolant material 60 is formed from a metal fiber that is a shape retaining body. Here, examples of the metal fiber forming the coolant material 60 include an aspect in which at least any one of steel wool or copper wool is included. However, the above aspects in the coolant material 60 are examples, and the coolant material 60 is not limited to the above aspects.

The coolant material 60 is formed into a substantially disk shape, for example, and is disposed at a bottom portion of the bottom container 120.

Projectile

Figure 4:
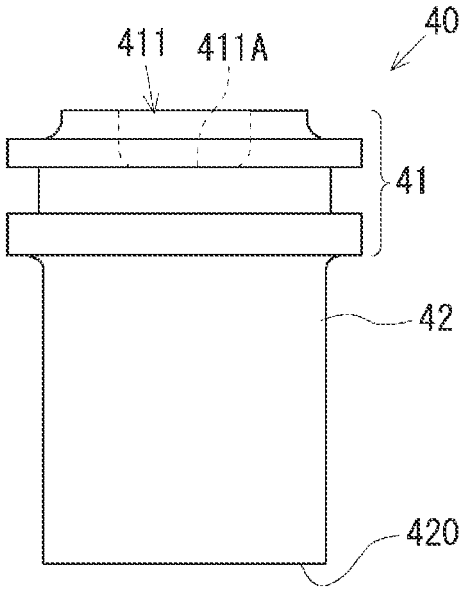
FIG. 4 is a front view of a projectile 40.
Figure 5:
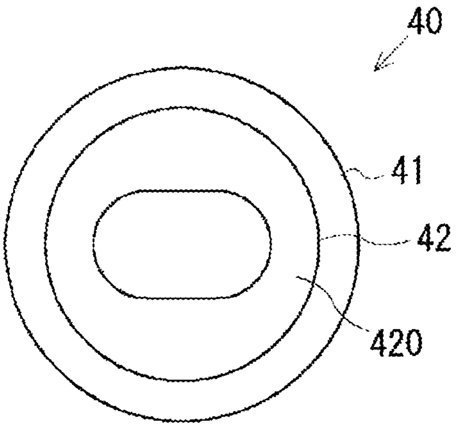
FIG. 5 is a bottom view of the projectile 40.
Figure 6:
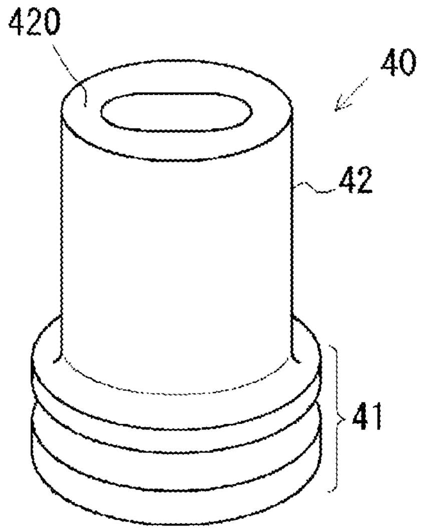
FIG. 6 is a perspective view of a projectile 40.

Next, the projectile 40 will be described. FIG. 4 is a front view of the projectile 40, FIG. 5 is a bottom view of the projectile 40, and FIG. 6 is a perspective view of the projectile 40. Note that in FIG. 6, in order to illustrate the lower surface of the projectile 40, the lower surface of the projectile 40 is illustrated facing upward in the drawing. The projectile 40 is formed from an insulating member such as a synthetic resin, for example, and includes the piston portion 41 and a rod portion 42 connected to the piston portion 41. The piston portion 41 has a substantially circular columnar shape and has an outer diameter substantially corresponding to an inner diameter of the large diameter cylinder portion 113 in the top holder 110. For example, the diameter of the piston portion 41 may be slightly smaller than the inner diameter of the large diameter cylinder portion 113. The shape of the projectile 40 can be changed as appropriate according to the shape of the housing 10 and the like. The piston portion 41 has an outer diameter larger than the diameter of the cavity portion 145 in the housing body 100, and is configured to not enter the cavity portion 145 but to strike against a peripheral member forming the cavity portion 145. That is, the piston portion 41 is formed with a transverse cross-sectional area orthogonal to the movement direction (axial direction) on the tip end side connected to the rod portion 42 being larger than the transverse cross-sectional area on the rear end side of the rod portion 42 and the transverse cross-sectional area of the cavity portion 145. The shape of the projectile 40 can be changed as appropriate according to the shape of the housing 10 and the like.

Further, the recess 411 having a circular columnar shape, for example, is formed in an upper surface of the piston portion 41. This recess 411 receives the ignition portion 21. A bottom surface of the recess 411 is formed as a pressure receiving surface 411A that receives energy received from the igniter 20 during actuation of the igniter 20. Further, a constricted portion having an outer circumferential surface recessed as compared with other locations is annularly formed along a circumferential direction of the piston portion 41 at an axially intermediate portion of the piston portion 41. An O-ring 43 is fitted into this constricted portion. The O-ring 43 is formed from, for example, rubber (silicone rubber, for example) or a synthetic resin, and functions to increase airtightness between an inner circumferential surface in the large diameter cylinder portion 113 and the piston portion 41.

The rod portion 42 of the projectile 40 is a rod-shaped member having an outer circumferential surface smaller in diameter than the piston portion 41 and extending along the extending direction of the accommodating space 13, for example, and is integrally connected to a lower end side of the piston portion 41. When the igniter 20 is actuated, the rod portion 42 moves along the extending direction of the accommodating space 13 and is inserted into the cavity portion 145 of the housing body 100. A lower end surface of the rod portion 42 is formed as a cutoff surface 420 for cutting off the cutoff portion 53 from the conductor piece 50 during actuation of the breaker device 1. Note that although the rod portion 42 in the present embodiment has a substantially cylindrical tubular shape, the shape thereof is not particularly limited, and can be changed in accordance with the shape and size of the cutoff portion 53 to be cut off from the conductor piece 50 during actuation of the breaker device 1. The rod portion 42 may have a columnar shape such as a cylinder, an elliptic cylinder, or a prism, for example. Note that, in the initial position of the projectile 40 illustrated in FIG. 1, a region on a tip end side including the cutoff surface 420 in the rod portion 42 of the projectile 40 is disposed above the cavity portion (a holding region) 145 of the housing body 100.

In the projectile 40 configured as described above, the projectile 40 is projected from the initial position illustrated in FIG. 1 when the upper surface of the piston portion 41 including the pressure receiving surface 411A receives the energy stress from the igniter 20 during actuation of the igniter 20, and moves at high speed toward the second end portion 12 side (downward) along the accommodating space 13. Specifically, as illustrated in FIG. 1, the piston portion 41 of the projectile 40 is accommodated inside the large diameter cylinder portion 113 in the top holder 110, and is slidable in the axial direction along an inner wall surface of the large diameter cylinder portion 113. The projectile 40 after being projected is stopped when the lower end surface of the piston portion 41 comes into contact with (collides with) the upper surface 101 of the housing body 100. That is, the rod portion 42 is fitted into the cavity portion 145 up to a rear end 421. In the present embodiment, the piston portion 41 of the projectile 40 has a substantially circular columnar shape, but the shape thereof is not particularly limited. As the outer shape of the piston portion 41, an appropriate shape and size can be adopted in accordance with the shape and size of the inner wall surface of the large diameter cylinder portion 113.

Operation

Next, operation content when the breaker device 1 is actuated to interrupt the electric circuit will be described. As described above. FIG. 1 illustrates a state of the breaker device 1 prior to actuation (hereinafter also referred to as the "pre-actuation initial state"). In this pre-actuation initial state, in the projectile 40 in the breaker device 1, the piston portion 41 is positioned on the first end portion 11 side (upper end side) in the accommodating space 13, and the cutoff surface 420 formed at the lower end of the rod portion 42 is set at an initial position positioned on the upper surface of the cutoff portion 53 in the conductor piece 50.

Furthermore, the breaker device 1 according to the embodiment further includes an abnormality detection sensor (not illustrated) that detects an abnormal state of a device (such as a vehicle, a power generation facility, or a power storage facility) to which an electric circuit to be cut off is connected, and a control unit (not illustrated) that controls the actuation of the igniter 20. In addition to the current flowing through the conductor piece 50, the abnormality detection sensor may be able to detect an abnormal state on the basis of a voltage or a temperature of the conductor piece 50. Further, the abnormality detection sensor may be, for example, an impact sensor, a temperature sensor, an acceleration sensor, a vibration sensor, or the like, and may detect an abnormal state such as an accident or fire on the basis of an impact, a temperature, acceleration, or vibration in a device such as a vehicle. The control unit of the breaker device 1 is a computer capable of performing a predetermined function by executing a predetermined control program, for example. The predetermined function of the control unit may be realized by corresponding hardware. Then, when excessive current flows through the conductor piece 50 forming a portion of the electric circuit to which the breaker device 1 is applied, the abnormal current is detected by the abnormality detection sensor. Abnormality information regarding the detected abnormal current is passed from the abnormality detection sensor to the control unit. For example, the control unit is energized from an external power source (not illustrated) connected to the conduction pins of the igniter 20 and actuates the igniter 20 based on the current value detected by the abnormality detection sensor. Here, the abnormal current may be a current value that exceeds a predetermined threshold value set for protection of a predetermined electric circuit. Note that the abnormality detection sensor and the control unit described above need not be included in the components of the breaker device 1, and may be included in a device separate from the breaker device 1, for example. Further, the abnormality detection sensor and the control unit are not essential components of the breaker device 1.

For example, when an abnormal current of the electric circuit is detected by an abnormality detection sensor that detects an abnormal current of the electric circuit, the control unit of the breaker device 1 actuates the igniter 20. That is, an actuating current is supplied from the external power source (not illustrated) to the conduction pins of the igniter 20, and as a result, the ignition charge in the ignition portion 21 is ignited and burns, generating a combustion gas. Then, the rupture surface 21A ruptures due to rise in pressure in the ignition portion 21, and the combustion gas of the ignition charge is discharged from the inside of the ignition portion 21 into the accommodating space 13.

Here, the ignition portion 21 of the igniter 20 is received in the recess 411 of the piston portion 41, and the rupture surface 21A of the ignition portion 21 is disposed facing the pressure receiving surface 411A of the recess 411 in the projectile 40. Therefore, the combustion gas from the ignition portion 21 is discharged to the recess 411, and the pressure (combustion energy) of the combustion gas is transmitted to the upper surface of the piston portion 41 including the pressure receiving surface 411A. As a result, the projectile 40 moves downward in the accommodating space 13 in the extending direction (axial direction) of the accommodating space 13.

Figure 7A:
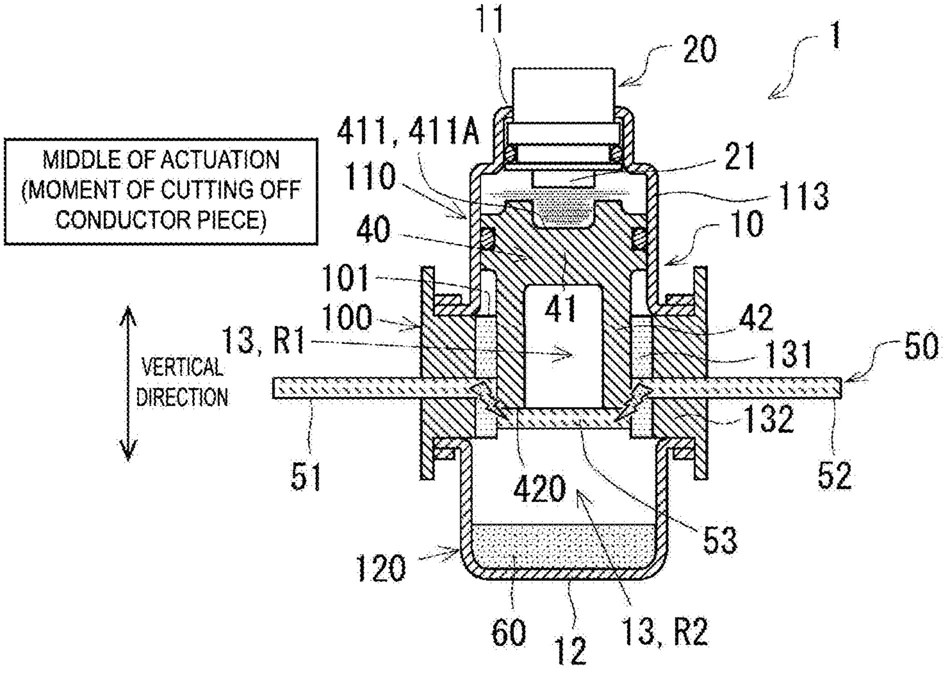
FIG. 7A is a view illustrating an actuation status of a breaker device 1.
Figure 7B:
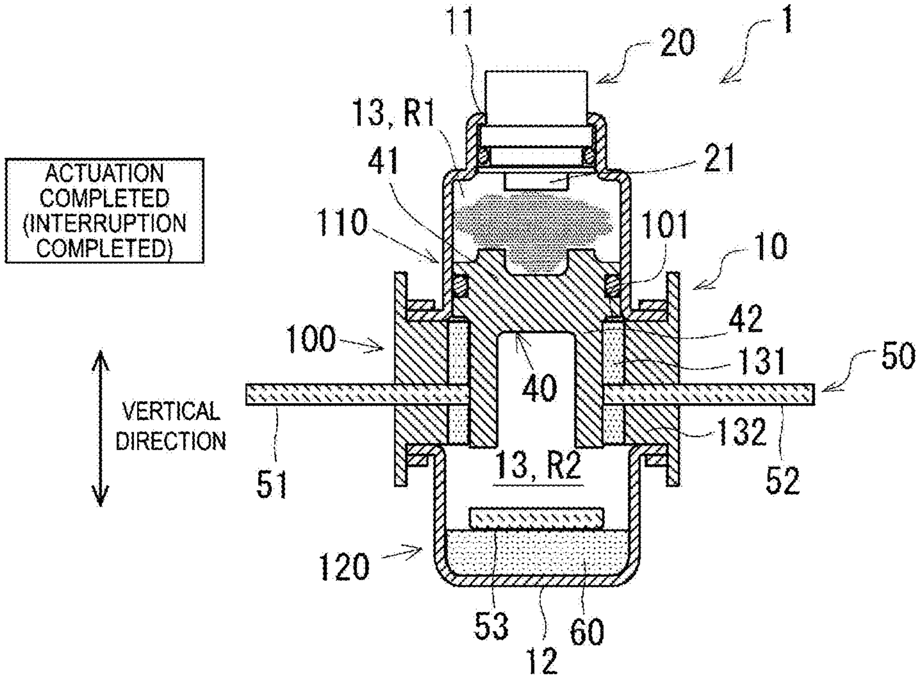
FIG. 7B is a view illustrating a status in which the actuation of the breaker device is complete.

FIGS. 7A and 7B are views illustrating an actuation status of the breaker device 1 according to the embodiment. FIG. 7A illustrates a status in the middle of actuation of the breaker device 1, and FIG. 7B illustrates a status in which the actuation of the breaker device 1 is completed. As described above, by the actuation of the igniter 20, the projectile 40 having received the pressure (combustion energy) of the combustion gas of the ignition charge is pushed downward vigorously, and as a result, the cutoff surface 420 formed on the lower end side of the rod portion 42 pushes and cuts, by shearing, boundary portions between the cutoff portion 53 and each of the first connection end portion 51 and the second connection end portion 52 of the conductor piece 50. As a result, the cutoff portion 53 is cut off from the conductor piece 50. Note that as long as the projectile 40 can be moved smoothly in the extending direction (axial direction) of the accommodating space 13 when the igniter 20 is actuated, the shape and the dimensions of the projectile 40 can be freely determined, and the outer diameter of the piston portion 41 in the projectile 40 may be set to a dimension equal to the inner diameter of the large diameter cylinder portion 113 in the top holder 110, for example.

Then, as illustrated in FIG. 7B, the projectile 40 moves downward along the extending direction (axial direction) of the accommodating space 13 by a predetermined stroke until the lower end surface of the piston portion 41 comes into contact with (collides with) the upper surface 101 of the housing body 100. In this state, the cutoff portion 53, which has been cut off from the conductor piece 50 by the rod portion 42 of the projectile 40, is received in the arc-extinguishing region R2 where the coolant material 60 is disposed. As a result, the first connection end portion 51 and the second connection end portion 52 positioned at both ends of the conductor piece 50 are brought into an electrically disconnected state, and a predetermined electric circuit to which the breaker device 1 is applied is forcibly interrupted. When the cutoff portion 53 is cut off from the conductor piece 50 by the rod portion 42, an arc is likely to be generated between the cutoff portion 53 about to be cut off and the first connection end portion 51 and the second connection end portion 52. However, even in a case where an arc is generated, the coolant material 60 takes away thermal energy of the arc and the cutoff portion 53 and cools the arc and the cutoff portion 53, thereby quickly eliminating the arc and suppressing the influence of the arc. When the projectile 40 is further moved by the actuation of the igniter 20 to cut off the cutoff portion 53, the piston portion 41 pushes the gas on the projectile initial arrangement region R1 side to the arc-extinguishing region R2 side together with the particles of the conductor piece 50 transpired by the arc heat, as the piston portion 41 moves in the large diameter cylinder portion 113, thereby guiding the arc to the arc-extinguishing region R2 side to be extinguished by the coolant material 60 or the like.

Operations and Effects of Embodiment

The breaker device 1 in the embodiment includes the housing body 100 including the inner forming portion 131 in contact with the cavity portion 145 and the outer forming portion 132 outside the inner forming portion 131. Since the housing body 100 has the inner forming portion 131 and the outer forming portion 132 that are separately formed, even if a crack is generated in the inner forming portion 131 when receiving an impact due to piston actuation, generation of the crack can be suppressed in the outer forming portion

132. Since no crack is generated in the outer forming portion 132, the internal gas can be suppressed from leaking to the outside.

While the embodiment of the electric circuit breaker device according to the present disclosure has been described above, each of the aspects disclosed in the present specification can be combined with any other feature disclosed in the present specification.

REFERENCE SIGNS LIST

1 Breaker device
10 Housing
13 Accommodating space
20 Igniter
40 Projectile
42 Rod portion
50 Conductor piece
53 Cutoff portion
60 Coolant material
100 Housing body
110 Top holder
120 Bottom container
131 Inner forming portion
132 Outer forming portion
145 Cavity portion (holding region)

The invention claimed is:

1. An electric circuit breaker device comprising:

a housing serving as an outer shell member and enclosing an accommodating space extending in one direction;

an igniter provided in the housing;

a projectile disposed in the housing and configured to be projected from one end side of the accommodating space by energy received from the igniter, the projectile being configured to move along an extending direction of the accommodating space; and a conductor piece held by the housing and forming a portion of an electric circuit, the conductor piece including a cutoff portion between a first connection end portion and a second connection end portion, the cutoff portion being cut off by movement of the projectile and being disposed across the accommodating space, wherein a region defined by an inner wall of the housing holding the conductor piece in the accommodating space serves as a holding region, the housing includes a housing body enclosing the holding region, and the housing body includes an inner forming portion disposed facing the holding region and an outer forming portion formed separately from the inner forming portion, the outer forming portion being disposed on an outer circumferential side of the inner forming portion without defining the holding region.

2. The electric circuit breaker device according to claim 1, wherein a material of the inner forming portion and a material of the outer forming portion are a same material.

3. The electric circuit breaker device according to claim 1, wherein a material of the inner forming portion and a material of the outer forming portion are different materials.

4. The electric circuit breaker device according to claim 3, wherein the material of the outer forming portion is a material higher in heat resistance temperature than the material of the inner forming portion.

5. The electric circuit breaker device according to claim 3, wherein the material of the inner forming portion is a material higher in impact resistance than the material of the outer forming portion.

6. The electric circuit breaker device according to claim 1, wherein the inner forming portion includes an upper forming portion disposed on an igniter side and a lower forming portion formed separately from the upper forming portion, the lower forming portion being disposed on a movement destination side of the projectile.

* * * * *